United States Patent
Frenger et al.

(10) Patent No.: US 10,383,038 B2
(45) Date of Patent: Aug. 13, 2019

(54) APPARATUS AND METHODS FOR PROVIDING AND RECEIVING SYSTEM INFORMATION IN A WIRELESS COMMUNICATIONS NETWORK

(71) Applicant: Telefonaktiebolaget LM Ericsson (publ), Stockholm (SE)

(72) Inventors: Pål Frenger, Linköping (SE); Erik Eriksson, Linköping (SE); Martin Hessler, Linköping (SE); Simon Sörman, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 155 days.

(21) Appl. No.: 15/119,309

(22) PCT Filed: May 13, 2016

(86) PCT No.: PCT/SE2016/050434
§ 371 (c)(1),
(2) Date: Aug. 16, 2016

(87) PCT Pub. No.: WO2017/196218
PCT Pub. Date: Nov. 16, 2017

(65) Prior Publication Data
US 2018/0152882 A1     May 31, 2018

(51) Int. Cl.
*H04W 16/28* (2009.01)
*H04W 48/14* (2009.01)
(Continued)

(52) U.S. Cl.
CPC .......... *H04W 48/14* (2013.01); *H04W 48/12* (2013.01); *H04W 74/0833* (2013.01); *H04W 16/28* (2013.01); *H04W 88/10* (2013.01)

(58) Field of Classification Search
CPC .............. H04W 48/10; H04W 72/005; H04W 72/0446; H04W 4/005
See application file for complete search history.

(56) References Cited

U.S. PATENT DOCUMENTS

2007/0049344 A1* 3/2007 Van Der Velde ..... H04W 48/12
455/560
2009/0322280 A1* 12/2009 Kamijo ................. H02J 7/025
320/108

(Continued)

FOREIGN PATENT DOCUMENTS

WO    2013077783 A1    5/2013

OTHER PUBLICATIONS

Unknown, Author, "Initial considerations on NR system access", Ericsson, 3GPP TSG-RAN WG2 #93bis, Tdoc R2-162763, Dubrovnik, Croatia, Apr. 11-15, 2016, 1-6.

*Primary Examiner* — Chi Ho A Lee
(74) *Attorney, Agent, or Firm* — Murphy, Bilak & Homiller, PLLC

(57) ABSTRACT

The present disclosure provides methods and apparatus for a wireless communications network in which system information can be provided on an efficient basis to mobile devices in the network. The system information is split into two parts, with the second part being transmitted to mobile devices in response to receipt of one or more request signals from those mobile devices. The second system information part may additionally be broadcast.

18 Claims, 11 Drawing Sheets

(51) Int. Cl.
*H04W 74/08* (2009.01)
*H04W 48/12* (2009.01)
*H04W 88/10* (2009.01)

(56) References Cited

U.S. PATENT DOCUMENTS

| | | | |
|---|---|---|---|
| 2010/0027466 | A1 | 2/2010 | Mustapha et al. |
| 2012/0115469 | A1* | 5/2012 | Chen ................... H04W 76/10 |
| | | | 455/434 |
| 2015/0078300 | A1 | 3/2015 | Xu et al. |
| 2015/0201368 | A1 | 7/2015 | Cudak et al. |
| 2016/0021681 | A1 | 1/2016 | Nan et al. |
| 2016/0073326 | A1* | 3/2016 | Vannithamby ........ H04W 4/005 |
| | | | 370/312 |
| 2016/0269939 | A1* | 9/2016 | Papasakellariou ........ H04L 1/00 |
| 2016/0270013 | A1* | 9/2016 | Soriaga ............. H04W 56/0015 |
| 2016/0338008 | A1* | 11/2016 | Xia ....................... H04W 48/10 |
| 2017/0048809 | A1* | 2/2017 | Takahashi ........... H04W 52/367 |
| 2017/0289876 | A1* | 10/2017 | Wu ....................... H04W 36/08 |
| 2017/0289877 | A1* | 10/2017 | Wu ....................... H04W 36/08 |
| 2017/0332325 | A1* | 11/2017 | Nan ................... H04W 72/042 |
| 2018/0027516 | A1* | 1/2018 | Han ................. H04W 56/0045 |

* cited by examiner

APPARATUS AND METHODS FOR PROVIDING AND RECEIVING SYSTEM INFORMATION IN A WIRELESS COMMUNICATIONS NETWORK

TECHNICAL FIELD

Embodiments of the present invention relate to apparatus and methods for providing and receiving system information in a wireless communications network.

BACKGROUND

In today's radio communications networks a number of different technologies are used, such as Long Term Evolution (LTE), LTE-Advanced, $3^{rd}$ Generation Partnership Project (3GPP) Wideband Code Division Multiple Access (WCDMA), Global System for Mobile Communications (GSM), Enhanced Data rate for GSM Evolution (EDGE), Worldwide Interoperability for Microwave Access (Wi-MAX), and Ultra Mobile Broadband (UMB) to mention a few. A radio communications network comprises radio network nodes providing radio coverage over at least one respective geographical area forming a cell. The cell definition may also incorporate frequency bands used for transmissions, which means that two different cells may cover the same geographical area but using different frequency bands. User equipments (UEs) are served in the cells by the respective radio network node and communicate with the respective radio network node. The UEs transmit data over an air or radio interface to the radio network nodes in uplink (UL) transmissions and the radio network nodes transmit data over an air or radio interface to the UEs in downlink (DL) transmissions.

Traditional radio communications networks broadcast cell-specific reference signals and system information. These signals let UEs determine which cell the UE should connect to and provide information to the UEs as to how they should access those cells.

In particular, the broadcasted system information may comprise parameters that control one or more of the timing, frequency, transmission formats and power to be used by UEs for initial (e.g. random access) transmissions to the network. Such information may be different in different cells, e.g., to be able to distinguish between accesses made in different cells, and/or to adjust the initial UE transmission power levels so as to fit the characteristics of different cells.

Since the wireless communication network (i.e., the radio network node) may not know the location or presence of all UEs in its cell(s), these cell-specific signals are generally broadcasted with constant and relatively high power and high periodicity. This ensures that all UEs will be able to receive such signals at all times.

Future wireless networks (e.g. such as those meeting or expected to meet the criteria for 5G) are expected to support vastly greater numbers of wireless devices, with different classes of devices having very different requirements. For example, numbers of smartphones are likely to increase, with each phone likely to require increasingly high data rates. Conversely, machine-type communication (MTC) devices, such as sensors, meters and the like, may be deployed in even higher numbers, but with much lower requirements for latency and data rate.

Further, future networks are expected to make use of higher frequency bands (e.g. above 60 GHz) where attenuation of the signal with distance is greater. Further still, certain scenarios exist with extreme area coverage requirements; in less densely populated parts of the world (e.g. parts of Australia), a single cell may be required to provide coverage over a much greater area than more densely populated areas.

Using a conventional system information broadcast to reach all such UEs (e.g. smartphones and MTC devices, etc) would be expensive (i.e. in terms of time slots, frequency, transmit power etc). A better solution is required in which resources can be allocated for the transmission of system information more efficiently.

WO 2013/077783 discloses a method in which a system information signature is transmitted or broadcasted by a radio network node of a radio communications network to a UE. The system information signature may comprise an index that indicates which set of system information is to be used by the UE to access the radio communications network. Upon receipt of the system information signature, the UE retrieves system information associated with the signature, and uses that system information to access the network.

SUMMARY

According to a first aspect of the present invention there is provided a method in a network node of a wireless communications network, the method comprising: initiating broadcast, from a base station of the wireless communications network, of a first system information signal containing a first system information part for the wireless communication network; and in response to receipt by the base station of one or more request signals from one or more mobile devices, initiating transmission, from the base station, of a second system information signal containing a second system information part. The method may be carried out in the base station (i.e. the network node is the base station), or in a server that is remote from the base station (i.e. the network node is the server). The latter embodiment reflects the increasing trend in telecommunications systems for functionality to be removed to servers operating in "the cloud".

In an embodiment, the method may further comprise the step of initiating broadcast, from the base station, of a third system information signal containing the second system information part. Thus the second system information part may be broadcast in addition to broadcast of the first system information part.

The third system information signal may be broadcast with a periodicity that is lower than a periodicity with which the first system information signal is broadcast. For example, a third system information signal may be scheduled for broadcast for every nth broadcast of the first system information signal, where n is an integer greater than one. Alternatively, the third system information signal may be broadcast for every broadcast of the third system information signal.

The one or more request signals may indicate that the one or more mobile devices failed to receive the third system information signal. That is, the request signals may be transmitted by mobile devices when those mobile devices failed to receive the third system information signal. The request signals may indicate this explicitly (e.g. if a new signal type is defined for the request signal, or the payload contains such a request) or implicitly (e.g. if the network node is able to interpret a particular signal as a request signal, for example as defined in a relevant standard).

The third system information signal may be broadcast with a lower energy per bit than the first system information signal. For example, the first system information signal may be broadcast with an energy per bit such that a certain percentage of users can receive it; the third information signal may be broadcast with an energy per bit that a lower percentage of users can receive it. The first system information signal may be broadcast with an energy per bit such that all, or substantially all, users can receive it.

The second system information signal may be received by the requesting mobile device with a greater energy per bit than the third system information signal, such that the requesting mobile device has a greater likelihood of receiving the second system information signal than the third system information signal. For example, the second system information signal may be directed towards the requesting mobile device, or encoded with link adaptation appropriate to the requesting mobile device.

The second system information part may contain a greater number of bits than the first system information part. For example, the first system information part may comprise between 10 and 100 bits, whereas the second system information part may comprise between 1000 and 10,000 bits.

The method may further comprise: determining a number of received request signals; comparing the number of received request signals to one or more thresholds; and determining whether to initiate the transmission of the second system information signal in dependence on the comparison. Alternatively, or in addition, the method may further comprise: determining a received power of received request signals; comparing the received power to one or more thresholds; and determining whether to initiate the transmission of the second system information signal in dependence on the comparison.

The disclosure further provides suitable apparatus to carry out the methods described above. In one aspect, there is provided a network node for a wireless communications network, the network node being configured to: initiate broadcast, from a base station of the wireless communications network, of a first system information signal containing a first system information part for the wireless communication network; and in response to receipt by the base station of one or more request signals from one or more mobile devices, initiate transmission, from the base station, of a second system information signal containing a second system information part.

In another aspect, there is provided a network node for a wireless communications network, the network node comprising processor circuitry and a computer-readable storage medium, the computer-readable storage medium storing instructions that are executable by the processor circuitry whereby the network node is operative to: initiate broadcast, from a base station of the wireless communications network, of a first system information signal containing a first system information part for the wireless communication network; and in response to receipt by the base station of one or more request signals from one or more mobile devices, initiate transmission, from the base station, of a second system information signal containing a second system information part.

In a further aspect, there is provided a network node for a wireless communications network, the network node comprising: a first module configured to initiate broadcast, from a base station of the wireless communications network, of a first system information signal containing a first system information part for the wireless communication network; and a second module configured to initiate transmission, from the base station, in response to receipt by the base station of one or more request signals from one or more mobile devices, of a second system information signal containing a second system information part.

In a yet further aspect, the present disclosure provides a method in a mobile device of a wireless communications network, the method comprising: receiving, from a base station of the wireless communications network, a first system information signal containing a first system information part for the wireless communication network; transmitting to the base station a request signal requesting transmission of a second system information signal containing a second system information part; and receiving, from the base station, the second system information signal containing the second system information part.

Suitable apparatus is provided to carry out such a method. For example, in one aspect, there is provided a mobile device, configured to: receive, from a base station of a wireless communications network, a first system information signal containing a first system information part for the wireless communication network; transmit to the base station a request signal requesting transmission of a second system information signal containing a second system information part; and receive, from the base station, the second system information signal containing the second system information part.

In another aspect, there is provided a mobile device comprising at least one antenna, processor circuitry and a computer-readable storage medium, the computer-readable storage medium storing instructions that are executable by the processor circuitry whereby the mobile device is operative to: receive, from a base station of a wireless communications network, a first system information signal containing a first system information part for the wireless communication network; transmit to the base station a request signal requesting transmission of a second system information signal containing a second system information part; and receive, from the base station, the second system information signal containing the second system information part.

In a yet further aspect, there is provided a mobile device, comprising: a first module configured to receive, from a base station of a wireless communications network, a first system information signal containing a first system information part for the wireless communication network; and a second module configured to transmit to the base station a request signal requesting transmission of a second system information signal containing a second system information part. The first module is further configured to receive, from the base station, the second system information signal containing the second system information part.

In one embodiment, particularly if the base station is configured to transmit using unlicensed spectrum, the method in the network node further comprises: prior to transmission of the second system information signal, determining whether the wireless resources on which the second system information signal is to be transmitted are free. Transmission of the second system information signal may then be initiated if the wireless resources are free. In a development of this embodiment, if the wireless resources are not free, the method may comprise initiating transmission of the second system information signal after a delay.

The corresponding method in the mobile device may further comprise: listening for the second system information signal during a window subsequent to transmission of the request signal; and in response to a determination that the second system information signal has not been received during the window, continuing to listen for the second system information signal after the window expires.

In a further embodiment, the present disclosure provides a method of equalizing the likelihood that multiple mobile devices will receive the second system information signal. For example, the method in the mobile device may be adapted such that the request signal is transmitted with a transmit power which is inversely proportional to the square of a path loss between the mobile device and the base station. The mobile device may estimate the path loss by measuring the received power of the first system information signal or a synchronization signal, for example, and then determining the path loss using knowledge of the transmit power of the first system information signal or the synchronization signal.

The method in the network node may further comprise: obtaining a path loss of the one or more request signals (for example by measuring the received power of the request signals and comparing this to the transmit power of the request signal). Transmission of the second system information signal may then be initiated by initiating transmission of the second system information signal with a transmit power that is inversely proportional to the path loss.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
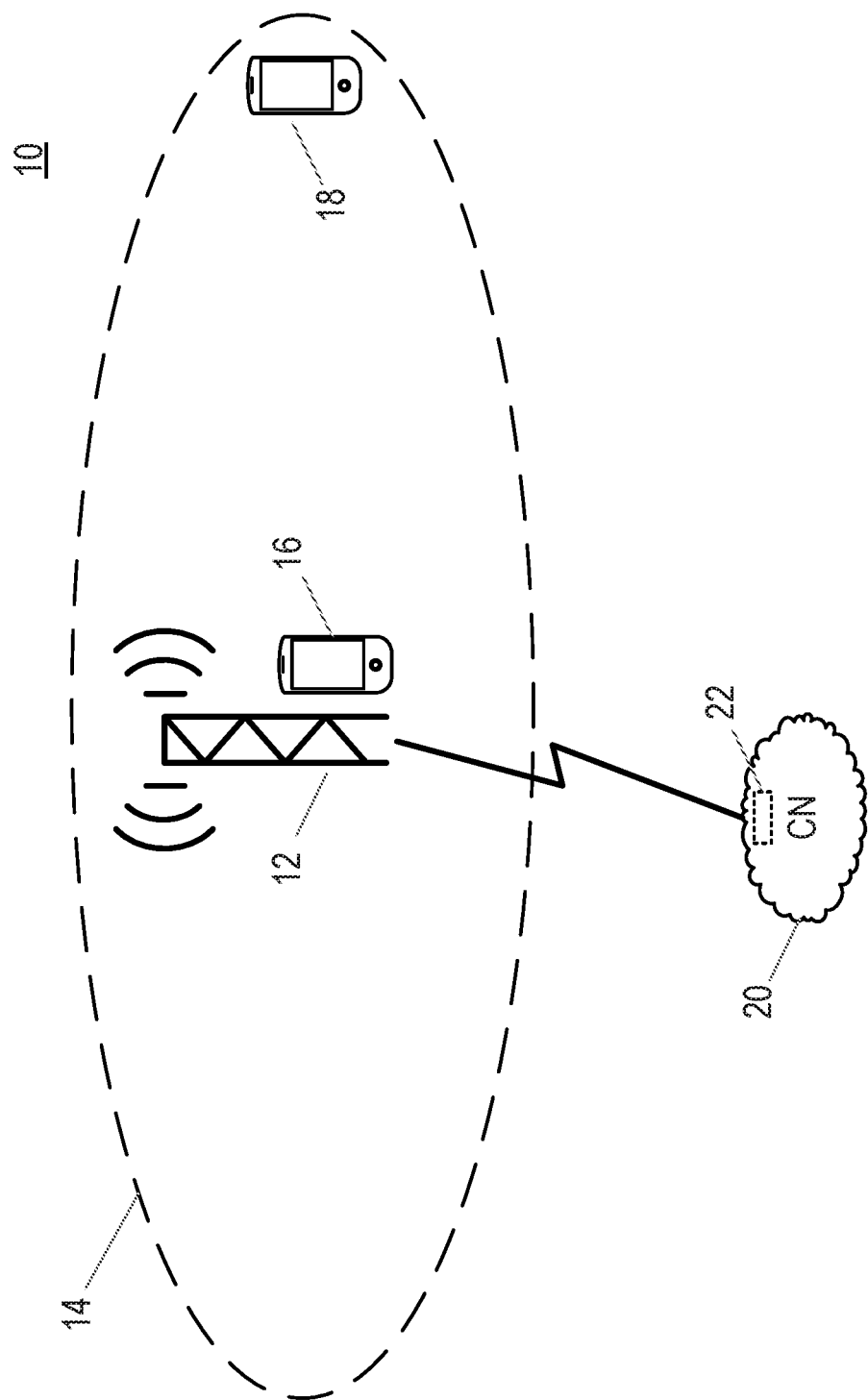
FIG. 1 is a schematic diagram showing a wireless communications network.

FIG. 1 is a schematic diagram of a wireless communication network 10 according to embodiments of the invention. Those skilled in the art will appreciate that numerous features and components of the network 10 are omitted from the drawing for clarity.

The wireless communication network 10 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 10 may be suitable for providing radio communications meeting one or more of the criteria established by the Next Generation Mobile Networks Alliance for the 5$^{th}$ generation of mobile telecommunications standards.

The network 10 comprises a radio network node 12 that provides radio coverage for a cell 14. A single radio network node is shown in FIG. 1, serving a single cell, but the network 10 will in general comprise a plurality of radio network nodes, with each node serving one or multiple cells over different coverage areas and/or frequencies.

The radio network node 12 may be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, relay and/or repeater, sensor, beacon device or any other network node configured for communication with the user equipment 110 over a wireless interface, depending e.g. of the radio access technology and terminology used. In the rest of the disclosure, the term "radio network node" will be used for the radio network node 12, in order to facilitate the comprehension of the present methods.

The network 10 further comprises two mobile devices 16, 18, which are located within the cell 14 and are thus within the coverage area of the radio network node 12. One of the mobile devices 16 is located relatively nearer to the radio network node 12 (i.e. towards the centre of the cell 14), while the other mobile device 18 is located relatively further from the radio network node 12 (i.e. towards the edge of the cell 14). Without loss of generality, the former mobile device 16 may be termed herein, "cell-centre mobile device", and the latter mobile device 18 termed, "cell-edge mobile device". These terms do not indicate that those mobile devices are necessarily at the cell centre or cell edge, but rather that the cell-centre mobile device 16 is nearer to the radio network node 12 than the cell-edge mobile device 18. Signals broadcast by the radio network node 12 may therefore be received with a higher signal strength at the cell-centre mobile device 16 than the cell-edge mobile device 18.

Further, the mobile device 16, 18 shown in FIG. 1 are smartphones. However, the mobile devices may be any device that is suitable for wireless communication with the radio network node 12. For example, the mobile devices may be phones, smartphones, tablets, etc, or machine-type communication (MTC) devices such as sensors, meters, etc. The mobile devices may also be called user equipments (UEs).

The network 10 further comprises a core network (CN) 20 in communication with the radio network node 12, that provides various services such as the routing of packets, etc, as is known in the art.

In one embodiment, the CN 20 comprises, or provides access to, a server 22 that is located remote from the radio network node 12, but provides control signals for the radio network node 12 and receives data signals from the radio network node 12. For example, the server 22 may be located in the "cloud". In these embodiments, elements of the functionality of the radio network node 12, which is to be described below, may be distributed to one or more virtual machines running on the server 22 (or more than one server). Except where explicitly stated otherwise, references below to functions carried out by the radio network node 12 may also be carried out in the server 22 (or a plurality of similar servers) located remote from the radio network node 12.

According to embodiments of the invention, the system information normally transmitted by the radio network node 12 is split into two parts: system information part 1 ($SIP_1$) and system information part 2 ($SIP_2$). $SIP_1$ may contain relatively few bits, while $SIP_2$ may contain relatively more bits. For example, in one embodiment, $SIP_1$ may contain a number of bits in the range from 10 to 100 bits, while $SIP_2$ may contain a number of bits in the range from 1000 to 10,000 bits. Further detail concerning the contents of $SIP_1$ and $SIP_2$ is provided below.

In one embodiment, $SIP_1$ is broadcast by the radio network node 12 with a first energy per bit, while $SIP_2$ is broadcast with a second energy per bit that is less than the first energy per bit. For example, a more robust transmission protocol may be used for $SIP_1$ than $SIP_2$, a more robust coding mechanism may be used for $SIP_1$ than $SIP_2$, greater time slots may be devoted to the transmission of $SIP_1$ than $SIP_2$, a wider band of frequencies may be used for the transmission of $SIP_1$ than $SIP_2$, or a higher transmission power may be used for $SIP_1$ than $SIP_2$. In all of these cases, $SIP_1$ is transmitted with a higher energy per bit than $SIP_2$.

For example, in one embodiment, $SIP_1$ may be transmitted such that the entire cell 14 is covered, i.e. such that all of the mobile devices in the cell 14 can receive and decode it the transmission. $SIP_2$ may be transmitted with a lower energy per bit such that less than 100% of the mobile devices in the cell 14 can receive and decode it. The precise parameters used for the transmission of $SIP_2$ may be adapted and set according to the needs of the network. Further exploration of this point can be found below with respect to FIGS. 12-15.

Figure 2:
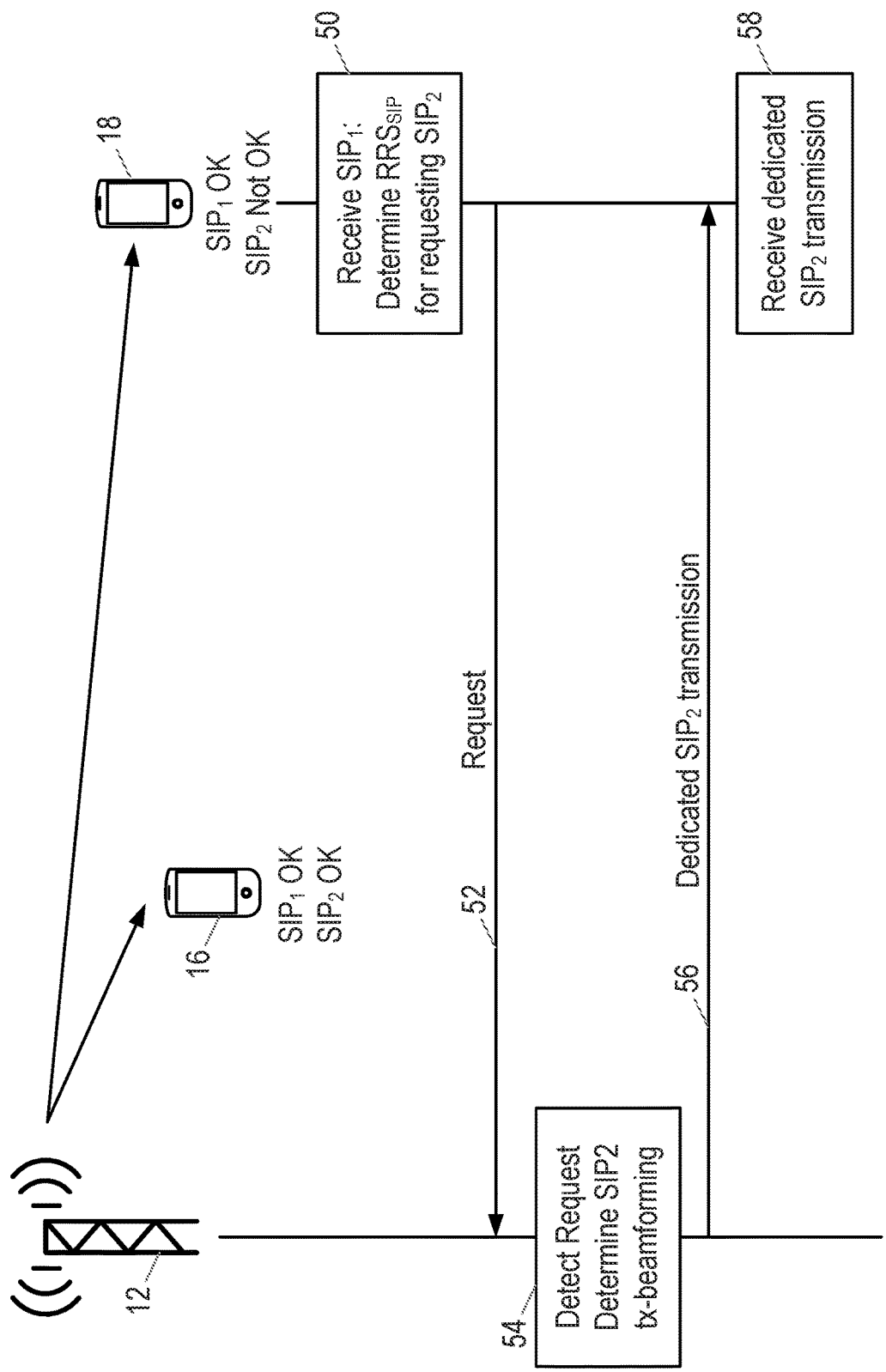
FIG. 2 is a signalling diagram showing the transmission of system information.

FIG. 2 is a signalling diagram showing a sequence of signals in the transmission of system information by the radio network node 12 to mobile devices 16, 18, according to embodiments of the invention.

The radio network node 12 first broadcasts $SIP_1$ and $SIP_2$ to the cell 14. The radio network node 12 may transmit $SIP_1$ and $SIP_2$ at substantially the same time as, or within a defined time window of, a synchronization signal enabling synchronization between the node 12 and the mobile devices 16, 18. For example, $SIP_1$ may be transmitted immediately after transmission of the synchronization signal, and $SIP_2$ may be transmitted immediately after transmission of $SIP_1$. Alternatively, $SIP_1$ may contain information as to the wireless resources (e.g. time, frequency etc) over which $SIP_2$ is to be subsequently broadcast.

As noted above, $SIP_1$ is transmitted with a greater energy per bit than $SIP_2$, and therefore has greater coverage than $SIP_2$. The cell-centre mobile device 16 is located relatively nearer to the radio network node 12 and thus receives and is able to decode both $SIP_1$ and $SIP_2$. The cell-edge mobile device 18 is located relatively further from the radio network node 12, and is able to receive and decode $SIP_1$ but not $SIP_2$.

Thus in step 50 $SIP_1$ is received by the mobile device 18 but $SIP_2$ is not. As the mobile device 18 knows that the system information is split into two parts, it is expecting to receive $SIP_2$ and therefore knows that the signal has been missed for some reason. The mobile device 18 then determines the parameters for a signal requesting the transmission of $SIP_2$ by the radio network node 12, and in step 52 transmits that request signal to the radio network node 12.

In the illustrated embodiment, the request signal is termed a reciprocal reference signal ($RRS_{SIP}$). The principle of reciprocity holds that the properties of the channel between a radio network node and a mobile device in uplink (i.e. transmissions from the mobile device to the radio network node) are related to the properties of the channel between the radio network node and the mobile device in downlink (i.e. transmissions from the radio network node to the mobile device). For example, the radio channel between a transmitter and a receiver will change over time, but only at a finite rate. If they can be determined accurately and quickly, one or more properties of the radio channel over which a signal is received from a particular device can be re-used in determining the transmission parameters for the subsequent transmission of a signal to that particular device. Through the use of one or more properties of the radio channel, the subsequent transmission should have a greater chance of being received by the particular device.

In embodiments employing reciprocity signals, $RRS_{SIP}$ is a signal that enables the radio network node 12 to determine one or more properties of the radio channel between the radio network node 12 and the mobile device 18. For example, the transmission parameters for $RRS_{SIP}$ may be specified in the $SIP_1$ message transmitted by the radio network node 12. Thus, $SIP_1$ may specify one or more transmission parameters for a request signal in the event that $SIP_2$ is not received by a mobile device. The one or more transmission parameters may include: one or more time slots over which $RRS_{SIP}$ should be transmitted; one or more frequencies over which $RRS_{SIP}$ should be transmitted; the type of reference signal to be transmitted (e.g. an uplink sync signal, an uplink channel state information reference signal (CSI-RS), an uplink RRS, etc).

Alternatively (for example, if the transmission parameters for $RRS_{SIP}$ are not specified in $SIP_1$), the mobile device 18 may transmit a signal to the radio network node 12 requesting one or more transmission parameters for $RRS_{SIP}$ following the failure to receive $SIP_2$. Such parameters can subsequently be transmitted by the radio network node 12 to the mobile device 18, or the radio network node may define an uplink reference signal to be transmitted by the mobile device 18.

In further alternative embodiments, the request signal transmitted by the mobile device 18 may not comprise a particular reference signal that allows determination of the radio channel between the mobile device 18 and the radio network node. For example, the mobile device 18 may transmit a signal such as a physical random access preamble (PRACH). Such a signal does not allow the radio channel to be determined. However, the direction from which the signal is received by the radio network node 12 provides information on the location of the mobile device 18 within the cell 14.

The request signal may be a dedicated signal that explicitly indicates to the radio network node 12 that the mobile device 18 failed to receive $SIP_2$. Alternatively, the request signal may implicitly indicate to the radio network node 12 that the mobile device 18 failed to receive $SIP_2$. For example, if the transmission parameters for the request signal are specified in $SIP_1$, a request signal using those transmission parameters, even in the absence of an explicit indication within the signal payload, can be taken as an indication that the mobile device transmitting it did not receive $SIP_2$.

The radio network node 12 thus receives a request signal and is able to determine one or more properties of the radio channel between the mobile device 18 and the radio network node 12, or the approximate location of the mobile device 18, in step 54. The one or more properties may include one or more of: an estimate of the channel over which the signal was transmitted; a direction from which the signal was transmitted; an estimate of path gain between the radio network node 12 and the mobile device 18; an estimate of time of arrival for signals transmitted between the radio network node 12 and the mobile device 18; and an estimate of link adaptation required for signals transmitted between the radio network node 12 and the mobile device 18. Those one or more properties can be re-used in determining the transmission parameters for a subsequent dedicated transmission of $SIP_2$ to the mobile device 18 in step 56.

In one embodiment the dedicated $SIP_2$ transmitted in step 56 is transmitted in a direction towards the mobile device 18. For example, if the radio network node 12 comprises a plurality of transmit antennas, $SIP_2$ may be transmitted using one or more of the transmit antennas that face in the direction from which the request signal was received. Alternatively, two or more of the plurality of transmit antennas may be used to beam-form the dedicated $SIP_2$ transmission to the mobile device 18.

In another embodiment, the dedicated $SIP_2$ is transmitted in step 56 with a power boost relative to the initial broadcast of $SIP_2$ (i.e. a higher transmit power).

In a further embodiment, an estimate of path gain between the radio network node 12 and the mobile device 18; an estimate of time of arrival for signals transmitted between the radio network node 12 and the mobile device 18; and an estimate of link adaptation required for signals transmitted between the radio network node 12 and the mobile device 18 may all be used to adapt the transmission parameters for the dedicated $SIP_2$ such that the mobile device 18 has a greater chance of receiving $SIP_2$ than the initial broadcast of $SIP_2$. For example, the dedicated transmission of $SIP_2$ may employ link adaptation according to the channel parameters identified above.

In step 58, the dedicated $SIP_2$ transmission is received and decoded by mobile device 18. As the $SIP_2$ transmission of step 56 is dedicated only for those mobile devices that requested it, the mobile device 18 has a greater likelihood of successfully receiving and decoding the transmission than the previous broadcast of $SIP_2$.

Figure 3:
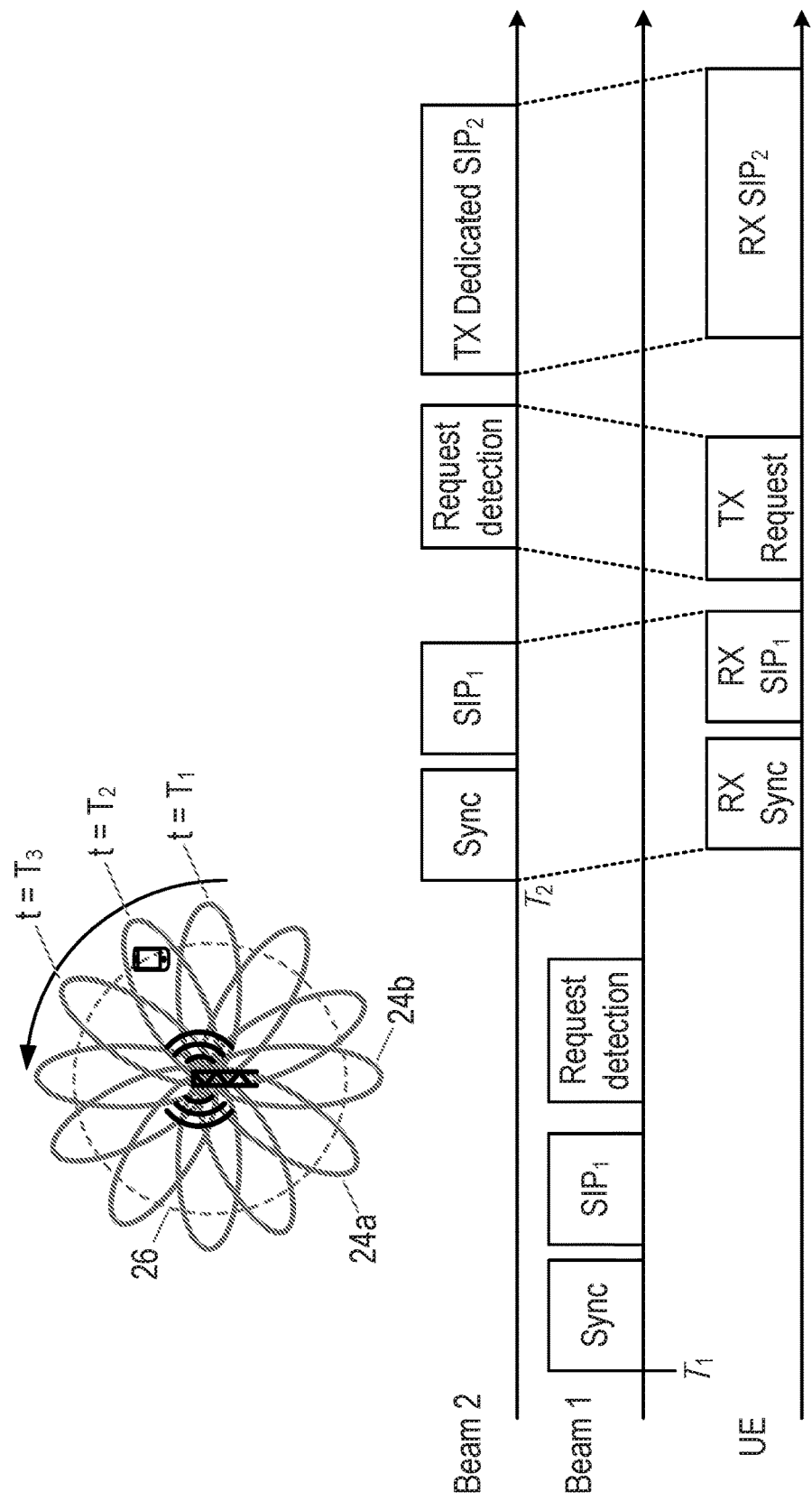
FIG. 3 is a further signalling diagram showing the transmission of system information.

FIG. 3 is a composite drawing showing the transmission of system information according to embodiments of the invention from a radio network node comprising a plurality of transmit antennas. The radio network node may be the same as the radio network node 12 described above, and thus the techniques discussed below with respect to FIG. 3 may be provided in a radio network node in addition to those discussed above with respect to FIG. 2.

The radio network node is capable of generating beams 24a, 24b emanating in different directions from the node. FIG. 3 illustrates 12 such beams (two or which are labelled); however, it will be apparent that any number of beams greater than one may be generated. The beams may be formed, for example, by transmitting using one or more transmit antennas facing in a particular direction, or by using beam-forming techniques to combine the transmissions of multiple transmit antennas and so concentrate a composite beam in a particular direction. The dashed circle represents the limits of a broadcast of $SIP_2$, for example as described above with respect to FIG. 2 (in which $SIP_1$ and $SIP_2$ are both broadcast to the cell). It can be seen that the reach of the directed beams is greater than the reach of the broadcast signal; that is, the furthest extent of each beam 24a, 24b is further from the radio network node than the limits 26 of the broadcast signal.

The radio network node performs beam-sweeping to transmit signals in a particular direction (and thus towards mobile devices in that direction), and then listen for response signals transmitted by mobile devices that have received the initial signals. For example, the radio network node may transmit $SIP_1$ in a first direction, and then wait for one or more request signals from mobile devices, located in that direction, that received $SIP_1$. If a request signal is received, the radio network node may then transmit $SIP_2$ in the same direction before moving on to a beam located in a different direction.

Thus, in the illustrated embodiment, at time $T_1$ the radio network node transmits using a first beam a synchronization signal followed immediately by a first part of the system information, $SIP_1$. The radio network node subsequently listens for responses (i.e. request signals) emanating from mobile devices located in the path of the first beam. For example, the radio network node may use the same antennas that transmitted $SIP_1$ at $T_1$ to listen for request signals, or the same direction beam-former as was used for the transmission of $SIP_1$ at $T_1$ may be used to listen for requests emanating from that direction.

As there are no mobile devices located in the path of the first beam in the illustrated embodiment, no request signals are received. For example, the radio network node may determine that no request signals have been received if no request signals are received within a time window of the $SIP_1$ transmission; alternatively, if $SIP_1$ contains an indication of the wireless resources to be used for the transmission of any request signals, the radio network node may determine that no request signals have been received if no request signals are received using the indicated resources.

At time $T_2$, the radio network node transmits a further synchronization signal and a further $SIP_1$ using a second beam pointed in a different direction to the first beam. The second beam may be directed such that the coverage of the first beam is adjacent to, or overlaps with, the coverage of the first beam. Alternatively, the second beam may point in an entirely different direction to the first beam.

As there is a mobile device located in the path of the second beam, the mobile device receives the synchronization signal and $SIP_1$, and transmits a request signal to the radio network node requesting transmission of a second part of the system information, $SIP_2$. As noted above, the request signal may be a reciprocal reference signal ($RRS_{SIP}$), a PRACH preamble, or any other suitable signal that the radio network node can determine as a request for transmission of $SIP_2$. The request signal may additionally allow the radio network node to determine one or more parameters of the radio channel between the radio network node and the mobile device; however, the direction of the mobile device is already known in this embodiment owing to the directionality of the original $SIP_1$ transmission.

The radio network node therefore subsequently transmits a dedicated $SIP_2$ signal to the mobile device. The dedicated $SIP_2$ may be beam-formed, or merely using the same second beam as the original $SIP_1$ transmission at time $T_2$. If the request signal allows the radio network node to determine the radio channel, the dedicated $SIP_2$ may be coded taking the channel conditions into account.

FIGS. 2 and 3 thus each show methods (which may be combined) of providing system information to mobile devices. In each case, the system information is transmitted in two parts. The second part, $SIP_2$, is sent in a dedicated transmission (possibly in addition to a broadcast of $SIP_2$) to mobile devices upon receipt of one or more request signals from those mobile devices. Thus relatively less wireless resources are utilized in sending dedicated transmissions of the majority of system information to those devices that request it.

Figure 4:
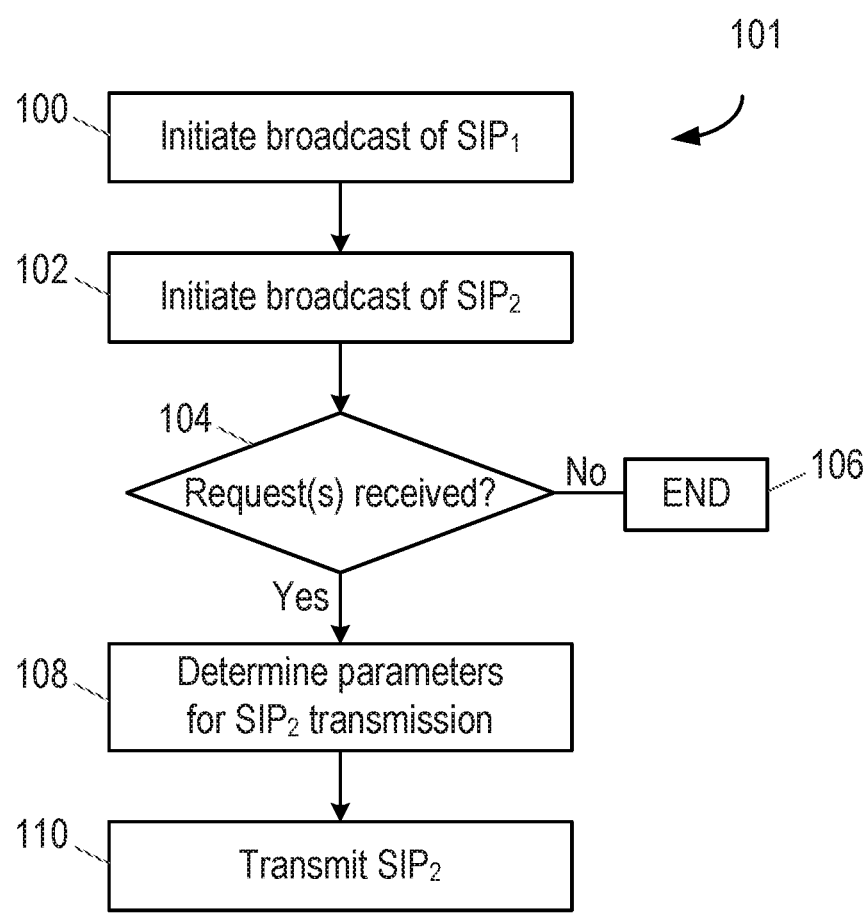
FIG. 4 is a flowchart of a method of transmitting system information.

FIG. 4 is a flowchart of a method 101, in a network node, of providing system information in accordance with embodiments of the invention. The method 101 may be carried out in the radio network node 12 or the server 22 described above.

In step 100, the broadcast of a signal $SIP_1$ containing a first part of the system information from radio network node 12 is initiated. For example, the server 22 may send a suitable control message to the radio network node 12, or the radio network node 12 itself may initiate transmission of $SIP_1$.

In one embodiment, $SIP_1$ is broadcast by the radio network node 12 with a first energy per bit. For example, in one embodiment, $SIP_1$ may be transmitted such that the entire cell 14 is covered, i.e. such that all or substantially all of the mobile devices in the cell 14 can receive and decode the transmission.

$SIP_1$ may contain relatively few bits, and may represent a minority of the total system information. For example, in one embodiment, $SIP_1$ may contain a number of bits in the range from 10 to 100 bits. In one embodiment, $SIP_1$ may contain information such as identifiers for the network 10 and/or the radio network node 12. In this way, mobile devices receiving $SIP_1$ can determine that the network 10 (and particularly the radio network node 12) is present.

$SIP_1$ may also contain an indication of the wireless resources (e.g. time slots, frequency, etc) over which a second part of the system information, $SIP_2$, is to be subsequently broadcast.

$SIP_1$ may further contain an indication of one or more transmission parameters for a request signal to be transmitted by mobile devices in the event that $SIP_2$ is not received. For example, the one or more transmission parameters may include: one or more time slots over which the request signal should be transmitted; one or more frequencies over which the request signal should be transmitted; the type of request signal to be transmitted (e.g. an uplink sync signal, an uplink channel state information reference signal (CSI-RS), an uplink RRS, etc).

In step 102, the broadcast of a signal $SIP_2$ containing a second part of the system information from radio network node 12 is initiated. For example, the server 22 may send a suitable control message to the radio network node 12, or the radio network node 12 itself may initiate transmission of $SIP_2$.

$SIP_2$ may be broadcast immediately after $SIP_1$, for example. Alternatively, $SIP_2$ may be broadcast using the wireless resources indicated in $SIP_1$ (in embodiments where $SIP_1$ contains such an indication).

$SIP_2$ may be broadcast with a periodicity that is lower than a periodicity with which the $SIP_1$ is broadcast. For example, $SIP_2$ may be scheduled for broadcast for every nth broadcast of $SIP_1$, where n is an integer greater than one. Alternatively, $SIP_2$ may be broadcast for every broadcast of $SIP_1$.

In one embodiment, $SIP_2$ is broadcast by the radio network node 12 with a second energy per bit, less than the first energy per bit. For example, in one embodiment, $SIP_2$ may be transmitted such that less than the entire cell 14 is covered (such that not all mobile devices in the cell 14 can receive it). For example, a more robust transmission protocol may be used for $SIP_1$ than $SIP_2$, a more robust coding mechanism may be used for $SIP_1$ than $SIP_2$, greater time slots may be devoted to the transmission of $SIP_1$ than $SIP_2$, a wider band of frequencies may be used for the transmission of $SIP_1$ than $SIP_2$, or a higher transmission power may be used for $SIP_1$ than $SIP_2$. In all of these cases, $SIP_1$ is transmitted with a higher energy per bit than $SIP_2$.

$SIP_2$ may contain relatively more bits than $SIP_1$, and may represent a majority of the total system information. For example, in one embodiment, $SIP_2$ may contain a number of bits in the range from 1000 to 10,000 bits. In one embodiment, $SIP_2$ may contain information that enables mobile devices to communicate with and access the services provided by the radio network node 12 and the network as a whole 10. For example, $SIP_2$ may contain information on one or more of: timing and frequency information to be used for transmissions to and from the radio network node 12; information on neighbouring radio network nodes; an access information table containing multiple sets of parameters to be used for accessing the radio network node (and to which a subsequently transmitted system signature index can point).

In one embodiment, step 102 is omitted, such that $SIP_2$ is not broadcast to the cell 14 at large. $SIP_2$ may not be broadcast even in the event that $SIP_1$ transmitted in step 100 contains an indication of the resources on which $SIP_2$ is to be transmitted.

Mobile devices that successfully receive both the broadcast $SIP_1$ and the broadcast $SIP_2$ may therefore access and communicate with the radio network node to provide services to users. Mobile devices that successfully receive $SIP_1$ but do not receive $SIP_2$ cannot access those services.

In step 104, it is determined whether the radio network node 12 received any request signals from mobile devices within the cell served by the radio network node indicating, explicitly or implicitly, that those mobile devices did not receive $SIP_2$ broadcast in step 102. For example, the radio network node 12 may receive the request signals and make the determination itself, or the radio network node 12 may receive the request signals and forward them to the server 22, which then makes the determination.

Step 104 may comprise receiving one or more request signals transmitted using the one or more transmission parameters indicated in $SIP_1$ (in embodiments where $SIP_1$ contains such an indication).

In embodiments employing reciprocity signals, the request signals may comprise $RRS_{SIP}$ signals.

Alternatively (for example, if the transmission parameters for $RRS_{SIP}$ are not specified in $SIP_1$), step 104 may comprise the sub-steps of receiving one or more signals from mobile devices requesting that the radio network node 12 provide one or more transmission parameters for a subsequent request signal (such as $RRS_{SIP}$). The radio network node 12 may then provide the requested parameters and subsequently receive one or more $RRS_{SIP}$ signals.

In further alternative embodiments, the request signals received in step 104 may not comprise a particular reference signal that allows determination of the radio channel between the mobile devices and the radio network node 12. For example, the request signals may comprise a signal such as a physical random access preamble (PRACH). Such a signal does not allow the radio channel to be determined. However, the direction from which the signal is received by the radio network node 12 provides information on the location of the mobile device that transmitted it.

The request signal may be a dedicated signal that explicitly indicates to the radio network node 12 that the mobile device 18 failed to receive SIP$_2$. Alternatively, the request signal may implicitly indicate to the radio network node 12 that the mobile device 18 failed to receive SIP$_2$. For example, if the transmission parameters for the request signal are specified in SIP$_1$, a request signal using those transmission parameters, even in the absence of an explicit indication within the signal payload, can be taken as an indication that the mobile device transmitting it did not receive SIP$_2$.

In one embodiment, step 104 comprises determining whether a threshold number of request signals have been received, or whether a threshold amount of power is received over resources reserved for the transmission of request signals. That is, if only a single request signal is received from a single mobile device (corresponding to relatively little received power), it may be deemed an inefficient use of resources to transmit a dedicated SIP$_2$ signal to that single mobile device. In certain embodiments, therefore, step 104 may comprise determining whether a threshold number of request signals has been received, or whether a threshold amount of power has been received (in the event that the resources reserved for the transmission of request signals are shared between multiple mobile devices).

In embodiments where step 102 is omitted, and SIP$_2$ is not broadcast to the cell 14 at large (even though it may have been scheduled), the request signals received in step 104 may give an indication of the number of mobile devices in the cell 14. That is, all devices that received SIP$_1$ should transmit request signals as none of them could have received SIP$_2$. Such information may be used subsequently to adapt the frequency of SIP$_1$ and SIP$_2$ broadcasts, so as to optimize the usage of resources to the number of users in the cell 14.

If no request signals are received, or less than the threshold number of request signals are received, or less than the threshold power is received, the method ends in step 106. Or rather, the method ends only to be subsequently repeated at a later time, as system information continues to be broadcast by the radio network node 12.

If request signals are received, or greater than the threshold number of request signals are received, or greater than the threshold power is received, the method proceeds to step 108 in which one or more parameters for a subsequent, dedicated transmission of SIP$_2$ are determined. Such a determination may be made by the radio network node 12 or the server 22.

For example, the direction in which the dedicated SIP$_2$ signal should be transmitted may be determined. If a request signal was received from a particular direction, the dedicated SIP$_2$ signal may be transmitted in that direction. The dedicated SIP$_2$ signal may be beam-formed in the direction from which the request signal was received. If multiple request signals are received from multiple directions, the dedicated SIP$_2$ may be transmitted or beam-formed in the direction from which the greatest number of request signals was received (or the greatest density of request signals was received).

If the request signals comprise one or more reference signals, such as RRS$_{SIP}$, one or more properties of the radio channel between the mobile devices transmitting the reference signals and the radio network node 12 may be determined, and used to adapt the subsequent dedicated transmission of SIP$_2$. The one or more radio properties may include one or more of: an estimate of the channels over which the one or more signals were transmitted; a direction from which the one or more signals were transmitted; an estimate of path gain between the radio network node 12 and the one or more mobile devices; an estimate of time of arrival for signals transmitted between the radio network node 12 and the one or more mobile devices; and an estimate of link adaptation required for signals transmitted between the radio network node 12 and the one or more mobile devices.

In another embodiment, the transmit power of the dedicated SIP$_2$ may be determined on the basis of the number of received request signals (or on the received power). The transmit power of the dedicated SIP$_2$ signal may be set relatively higher in response to a relatively large number of received request signals (or received power) and relatively lower in response to a relatively lower number of received request signals (or received power).

In one embodiment, step 104 may comprise receiving request signals from mobile devices on different resources dependent on the strength of signals received by those mobile devices. For example, upon receipt of SIP$_1$ and/or the synchronization signal, each mobile device may determine the received power of the received signal and compare it to one or more thresholds. Dependent on the comparison, the mobile device may elect to transmit a request signal using a first set of resources (e.g. a first frequency and/or a first time slot) or a second set of resources (e.g. a second frequency and/or a second time slot). For example, if the received power is below the threshold, the first set may be used (indicating that the mobile device is relatively far away from the radio network node, i.e. near the cell edge); if the received power is above the threshold, the second may be used (indicating that the mobile device is relatively near to the radio network node, i.e. near the cell centre). More than two sets of resources may be defined. The sets of resources to be used for the request signals may be indicated in SIP$_1$, for example, as before. The particular request signal that is received by the radio network node therefore gives an indication of the strength In step 110, transmission of the dedicated SIP$_2$ signal by the radio network node 12 is initiated, using the parameters determined in step 108. For example, the radio network node 12 itself may initiate transmission, or the server 22 may send a suitable control message to the radio network node 12 to initiate transmission.

Step 110 may comprise a sub-step of sensing the spectrum in order to make sure that the radio link between the radio network node 12 and the mobile device(s) that transmitted request signals is free, particularly in embodiments where the system information is being transmitted using unlicensed spectrum. In order to avoid conflict with other users of that unlicensed spectrum, prior to the transmission of the dedicated SIP$_2$ signal, the radio network node 12 may first determine whether the radio link is free of interfering transmissions. If the spectrum is not free, the radio network node 12 may delay transmission of the dedicated SIP$_2$ signal until the spectrum becomes free.

In one embodiment, step 104 may comprise receiving request signals from mobile devices on different resources dependent on the strength of signals received by those mobile devices. For example, upon receipt of SIP$_1$ and/or the synchronization signal, each mobile device may determine the received power of the received signal and compare it to one or more thresholds. Dependent on the comparison, the mobile device may elect to transmit a request signal using a first set of resources (e.g. a first frequency and/or a first time slot) or a second set of resources (e.g. a second frequency and/or a second time slot). For example, if the received power is below the threshold, the first set may be used (indicating that the mobile device is relatively far away from the radio network node, i.e. near the cell edge); if the received power is above the threshold, the second may be used (indicating that the mobile device is relatively near to the radio network node, i.e. near the cell centre). More than two sets of resources may be defined. The sets of resources to be used for the request signals may be indicated in $SIP_1$, for example, as before. The particular request signal that is received by the radio network node therefore gives an indication of the strength with which signals will be received by the mobile devices.

In this embodiment, step 108 may be adapted such that different transmission parameters and different $SIP_2$ transmissions may be determined for the different groups of mobile devices. Alternatively, the transmission parameters that are determined may comprise a composite beam-former that compensates for the different received power values in all mobile devices.

Figure 5:
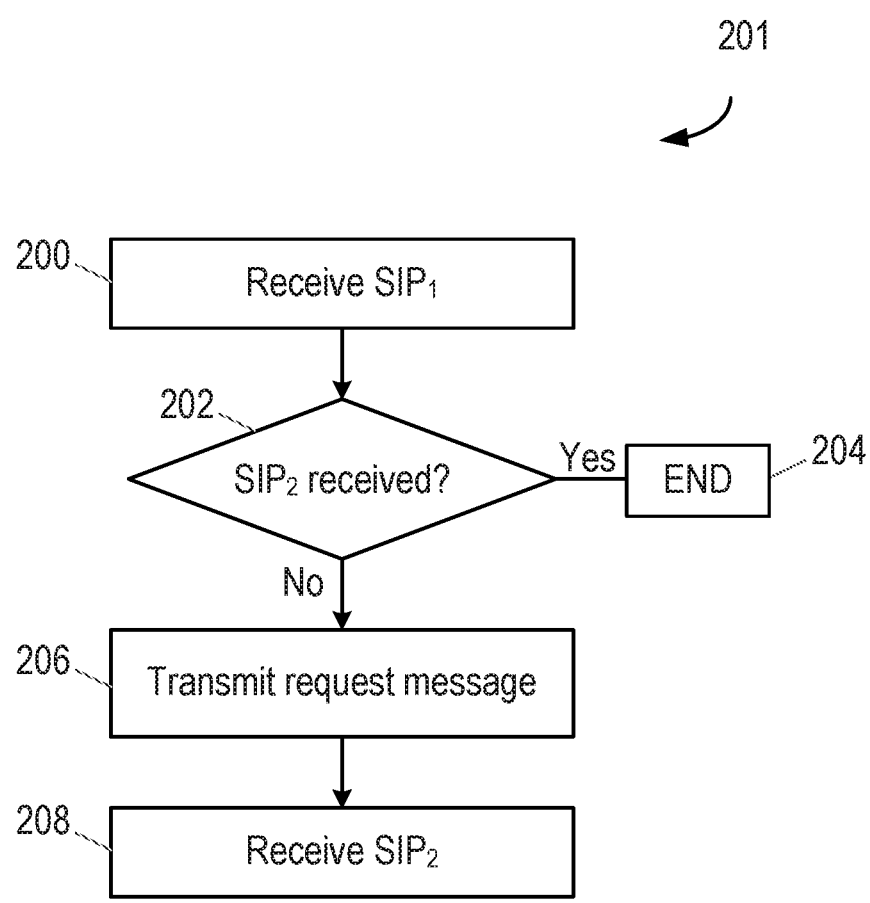
FIG. 5 is a flowchart of a method of receiving system information.

FIG. 5 is a flowchart of a method 201, in a mobile device, of receiving system information in accordance with embodiments of the invention. The method 201 may be carried out in the mobile devices 16, 18 described above.

In step 200, a first broadcast signal $SIP_1$, containing a first part of the system information, is received. $SIP_1$ may correspond substantially to the description of that signal given above. The mobile device may additionally receive a synchronization signal transmitted at substantially the same time, or just prior to $SIP_1$.

In step 202, the mobile device determines whether or not a second broadcast signal $SIP_2$, containing a second part of the system information, is received. $SIP_2$ may correspond substantially to the description of that signal given above. For example, the broadcast signal $SIP_2$ may be scheduled for transmission immediately after the broadcast of $SIP_1$. Alternatively, $SIP_1$ may contain an indication of the wireless resources over which $SIP_2$ is scheduled to be broadcast.

In step 202, therefore, the mobile device attempts to receive $SIP_2$ using the scheduled resources. Of course, in one embodiment described above, $SIP_2$ may not be broadcast by the radio network node 12 even though it is scheduled.

If $SIP_2$ is successfully received, the method ends in step 204. The mobile device may now use the system information provided in $SIP_1$ and $SIP_2$ to access the radio network node 12 and the network 10, and provide services to its user.

If $SIP_2$ is not successfully received in step 202, the method proceeds to step 206 in which the mobile device transmits a request signal to the radio network node 12 indicating, explicitly or implicitly, that the broadcast $SIP_2$ was not received and requesting a dedicated transmission of $SIP_2$.

The request signal may be transmitted using one or more transmission parameters indicated for that purpose in $SIP_1$ (in embodiments where $SIP_1$ contains such an indication).

In one embodiment, the request signal may comprise $RRS_{SIP}$ signals.

Alternatively (for example, if the transmission parameters for $RRS_{SIP}$ are not specified in $SIP_1$), step 206 may comprise the sub-steps of transmitting a signal requesting that the radio network node 12 provide one or more transmission parameters for a subsequent request signal (such as $RRS_{SIP}$). The radio network node 12 may then provide the requested parameters, and the mobile device can then subsequently transmit the one or more $RRS_{SIP}$ signals using those parameters.

In further alternative embodiments, the request signal transmitted in step 206 may not comprise a particular reference signal that allows determination of the radio channel between the mobile devices and the radio network node 12. For example, the request signal may comprise a signal such as a physical random access preamble (PRACH). Such a signal does not allow the radio channel to be determined. However, the direction from which the signal is received by the radio network node 12 provides information on the location of the mobile device that transmitted it.

The request signal may be a dedicated signal that explicitly indicates to the radio network node 12 that the mobile device failed to receive $SIP_2$.

Alternatively, the request signal may implicitly indicate to the radio network node 12 that the mobile device failed to receive $SIP_2$. For example, if the transmission parameters for the request signal are specified in $SIP_1$, a request signal using those transmission parameters, even in the absence of an explicit indication within the signal payload, can be taken as an indication that the mobile device transmitting it did not receive $SIP_2$.

In a yet further embodiment, step 206 may comprise the sub-steps of determining a strength with which $SIP_1$ (or the synchronization signal) was received in step 200 and comparing that value to one or more thresholds. If the strength is greater than a threshold, then a first request message may be transmitted (e.g. using a first set of resources such as a first frequency and/or a first timeslot); if the strength is less than the threshold, then a second request message may be transmitted (e.g. using a second set of resources such as a second frequency and/or a second timeslot).

In step 208, a dedicated $SIP_2$ transmission is received by the mobile device. The $SIP_2$ transmission may be directed towards the mobile device, for example using either beam-forming techniques or an antenna that is pointing towards the mobile device. The dedication $SIP_2$ transmission may therefore have a greater energy per bit at the mobile device than the broadcast signal $SIP_2$ attempted to be received in step 202.

If no dedicated $SIP_2$ transmission is received within a defined time window (e.g. following the transmission of the request signal in step 206), step 208 may further comprise the step of continuing to listen for the dedicated $SIP_2$ transmission after the time window ends. For example, if $SIP_2$ is transmitted using unlicensed spectrum, the radio network node 12 may be unable to transmit due to interference on the spectrum. In that case, the radio network node 12 may transmit as soon as the spectrum becomes available, and therefore the mobile device may continue to listen for the dedicated $SIP_2$ transmission for a period of time after the time window expires.

It may be noted that multiple request signals from multiple mobile devices may be received over the same resources. In that case, the subsequent dedicated $SIP_2$ transmission may become less effective as many mobile devices will need to successfully receive it.

In one embodiment, therefore, the dedicated $SIP_2$ transmission may be transmitted with a signal component towards each mobile device that is inversely proportional to the path loss to that respective mobile device, while the request signals transmitted by each mobile device and received by the radio network node 12 may be transmitted with a power that is inversely proportional to the square of the estimated path gain between the respective mobile device and the radio network node 12.

That is, the mobile devices may have knowledge (for example through code stored on the devices or from previous communications with the network 10) of the transmit power used for $SIP_1$ and/or the synchronization signals. Using that knowledge and the measured power with which those signals were received by the mobile device, each mobile device is able to estimate its respective path gain. Each mobile device may then transmit its respective request signal using a transmit power that is equal to the transmit power specified for the request signal (e.g. in the $SIP_1$ broadcast) divided by the square of the estimated path gain. The radio network node 12 then receives each request signal with a transmit power equal to the transmit power specified for the request signal divided by the path gain for the mobile device that transmitted the request signal (the signal having passed through the channel again). The dedicated $SIP_2$ transmission may then be transmitted by the radio network node 12 with a signal component towards each mobile device that is inversely proportional to the path loss to that respective mobile device. In this way, each mobile device will receive the dedicated $SIP_2$ transmission with the same power.

Thus FIGS. 4 and 5 provide methods 101, 201 in which system information can be provided on an efficient basis to mobile devices in the network.

Figure 6:
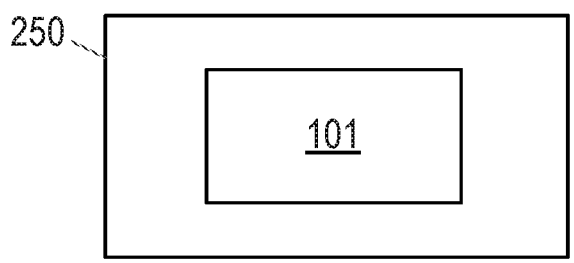
FIG. 6 is a schematic diagram of a network node.

FIG. 6 shows a network node 250 according to embodiments of the invention. The network node 250 may be a radio network node, such as the radio network node 12, or a server such as the server 22.

The network node 250 is configured to carry out the method 101 described above with respect to FIG. 4. In particular, the network node may be configured to: initiate broadcast, from a base station of the wireless communications network (such as the radio network node 12), of a first system information signal containing a first system information part for the wireless communication network 10; and, in response to receipt by the base station of one or more request signals from one or more mobile devices (such as the mobile devices 16, 18), initiate transmission, from the base station, of a second system information signal containing a second system information part.

Figure 7:
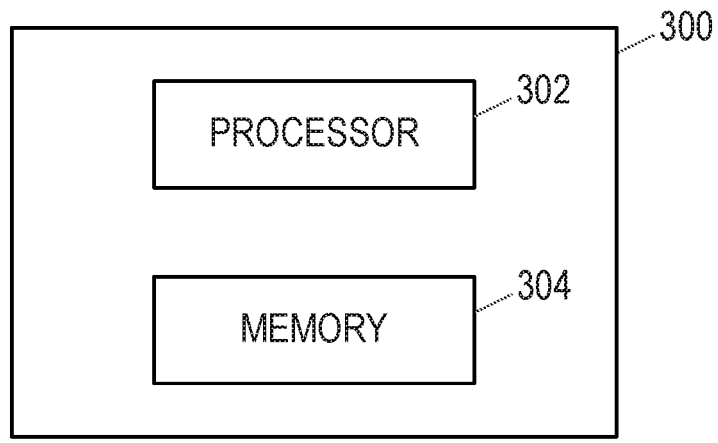
FIG. 7 is a schematic diagram of another network node.

FIG. 7 shows a network node 300 according to embodiments of the invention. The network node 300 may be a radio network node, such as the radio network node 12, or a server such as the server 22.

The network node 300 comprises processor circuitry 302 and a computer-readable storage medium 304 (such as memory). The computer-readable storage medium 304 stores instructions that are executable by the processor circuitry 302 whereby the network node 300 is operative to initiate broadcast, from a base station of the wireless communications network, of a first system information signal containing a first part of the system information for the wireless communication network; and in response to receipt by the base station of one or more request signals from one or more mobile devices, initiate transmission, from the base station, of a second system information signal containing a second part of the system information.

In embodiments where the network node 300 is a radio network node, the node 300 additionally comprises one or more antennas and transceiver circuitry operative to transmit and receive wireless signals over those antennas. In embodiments where the network node 300 is a server, the node 300 additionally comprises one or more interfaces over which control signals and data signals can be received from and transmitted to a radio network node.

Figure 8:
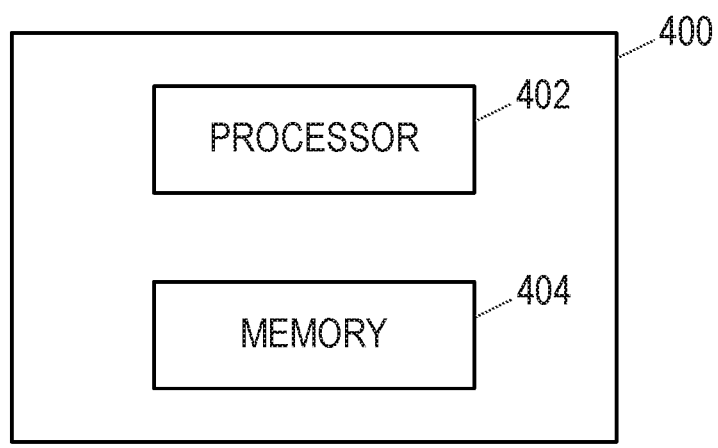
FIG. 8 is a schematic diagram of a mobile device.

FIG. 8 shows a mobile device 400 comprising processor circuitry 402 and a computer-readable storage medium 404 (such as memory). The computer-readable storage medium stores instructions that are executable by the processor circuitry whereby the mobile device is operative to: receive, from a base station of a wireless communications network, a first system information signal containing a first part of the system information for the wireless communication network; transmit to the base station a request signal requesting transmission of a second system information signal containing a second part of the system information; and receive, from the base station, the second system information signal containing the second part of the system information.

The mobile device 400 may additionally comprise one or more antennas and transceiver circuitry, coupled to the one or more antennas and the processor circuitry 402, that is operative to transmit and receive wireless signals over the one or more antennas.

Figure 9:
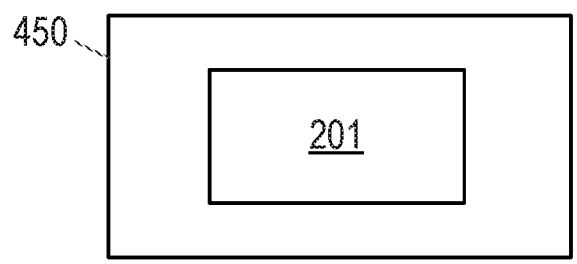
FIG. 9 is a schematic diagram of another mobile device.

FIG. 9 shows a mobile device 450 according to embodiments of the invention.

The mobile device 450 is configured to carry out the method 201 described above with respect to FIG. 5. In particular, the mobile device 450 may be configured to: receive, from a base station of a wireless communications network (such as the radio network node 12), a first system information signal containing a first system information part for the wireless communication network; transmit to the base station a request signal requesting transmission of a second system information signal containing a second system information part; and receive, from the base station, the second system information signal containing the second system information part.

Figure 10:
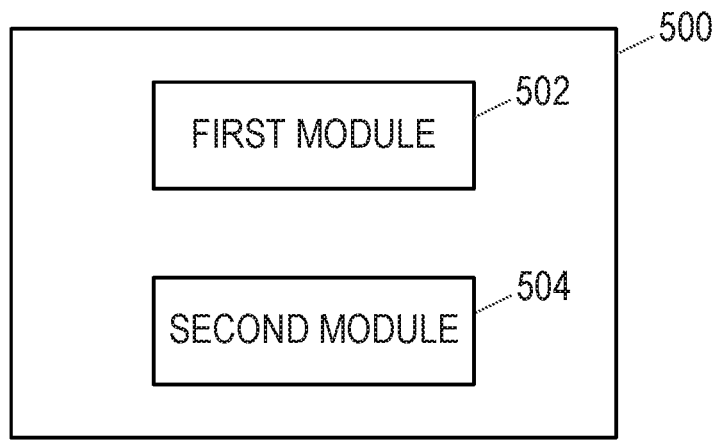
FIG. 10 is a schematic diagram of another network node.

FIG. 10 shows a network node 500 for a wireless communications network. The network node 500 may be a radio network node, such as the radio network node 12, or a server such as the server 22.

The network node comprises: a first module 502 configured to initiate broadcast, from a base station of the wireless communications network, of a first system information signal containing a first part of the system information for the wireless communication network; and a second module 504 configured to initiate transmission, from the base station, in response to receipt by the base station of one or more request signals from one or more mobile devices, of a second system information signal containing a second part of the system information.

In embodiments where the network node 500 is a radio network node, the node 500 additionally comprises one or more antennas and transceiver circuitry operative to transmit and receive wireless signals over those antennas. In embodiments where the network node 500 is a server, the node 500 additionally comprises one or more interfaces over which control signals and data signals can be received from and transmitted to a radio network node.

Figure 11:
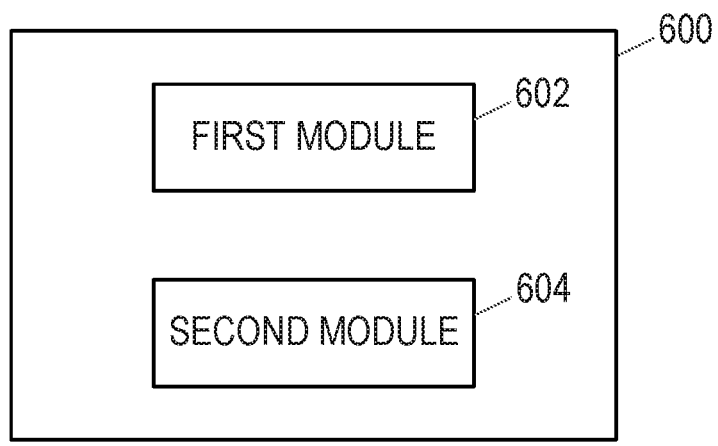
FIG. 11 is a schematic diagram of another mobile device.

FIG. 11 shows a mobile device 600, comprising: a first module 602 configured to receive, from a base station of a wireless communications network, a first system information signal containing a first part of the system information for the wireless communication network; and a second module 604 configured to transmit to the base station a request signal requesting transmission of a second system information signal containing a second part of the system information. The first module 602 is further configured to receive, from the base station, the second system information signal containing the second part of the system information.

The mobile device 600 may further comprise one or more antennas and transceiver circuitry, coupled to the one or more antennas and the first and second modules 602, 604, that is operative to transmit and receive wireless signals over the one or more antennas.

Figure 12:
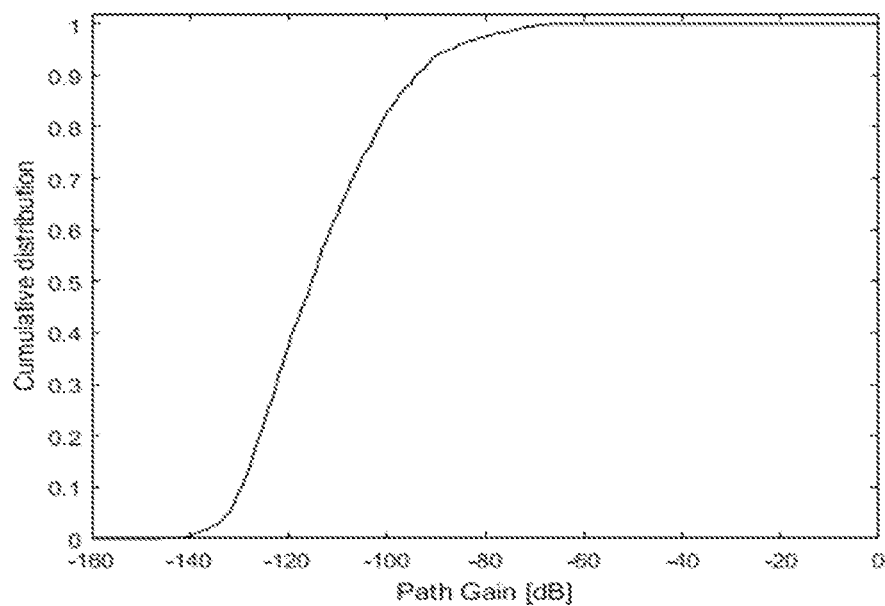
FIG. 12 is a graph showing the distribution of channel path gains for a simulated group of UEs.

FIG. 12 is a graph showing the distribution of channel path gains for a simulated group of 1000 mobile devices. The distribution and numbers are typical for devices in an urban environment. Shannon's theorem gives a limit on the amount of bandwidth that is needed for reliable communication at a certain data rate and a certain channel quality. Together with the distribution shown in FIG. 12, one can obtain an estimation of the reduction in bandwidth possible in different system setups using the concepts described above.

Figure 13:
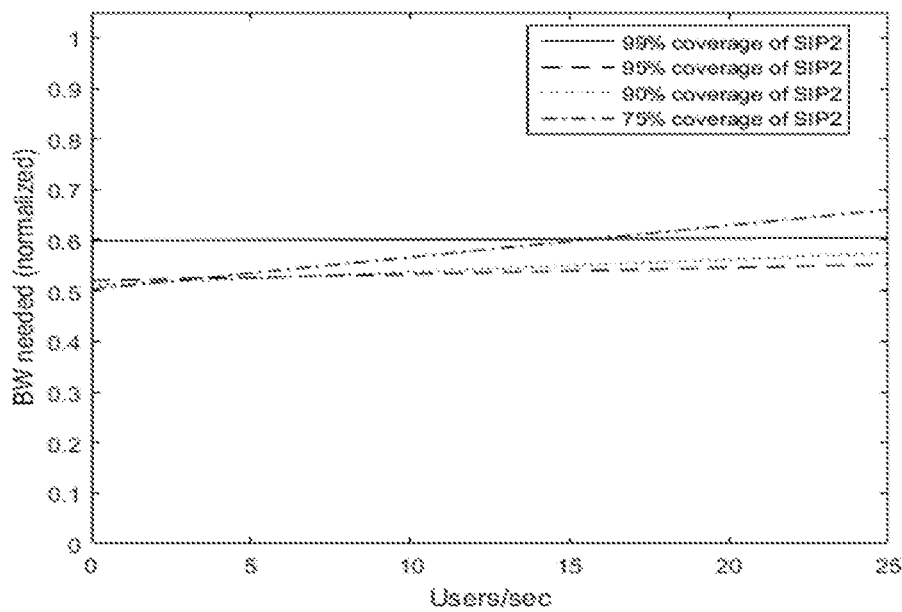
FIG. 13 is a graph showing the variation of bandwidth usage with user arrival rate for a number of different coverages for the second system information part.

FIG. 13 is a graph showing the variation of bandwidth usage with user arrival rate for a number of different coverages for the second part of the system information.

At first, consider the scenario where $SIP_1$ is broadcast by the radio network node 12 with sufficient resources to get the same coverage as the network (i.e. all users), whereas $SIP_2$ is broadcast only with resources sufficient to provide coverage for a part of the network (i.e. not all users). The simulation also makes the assumptions that the sizes of both $RRS_{SIP}$ and $SIP_1$ are 10% of the size of $SIP_2$, that $SIP_1$ is broadcast every 50 ms accompanied by $SIP_2$ every 10th time, and that subsequent dedicated transmissions of $SIP_2$ use beamforming with a gain of 20 dB. Based on the allocation of resources to reception of $RRS_{SIP}$, one obtains the relative amount of total bandwidth (BW) needed as in FIG. 13. The allocated $RRS_{SIP}$ resources correspond to a certain arrival rates of users, i.e. when allocating for 10 users per second, this is the expected maximum rate of users that can be served. This allocation is made to have the same coverage as $SIP_1$.

The values of BW are normalized such that a BW of 1 refers to the amount of BW needed in a "conventional" scenario where $SIP_1$ and $SIP_2$ are only broadcast (i.e. without subsequent dedicated transmissions of $SIP_2$), each having the same coverage as the network.

Clearly, there is a large reduction in the required resources, of 35-50% depending on the coverage of $SIP_2$ and the expected user arrival rate. Of course, 50% of the BW in the conventional strategy is needed for $SIP_1$, and that BW may also be needed when employing the concepts described above. Therefore, the reduction of BW needed for $SIP_2$ (and $RRS_{SIP}$) is very large.

Figure 14:
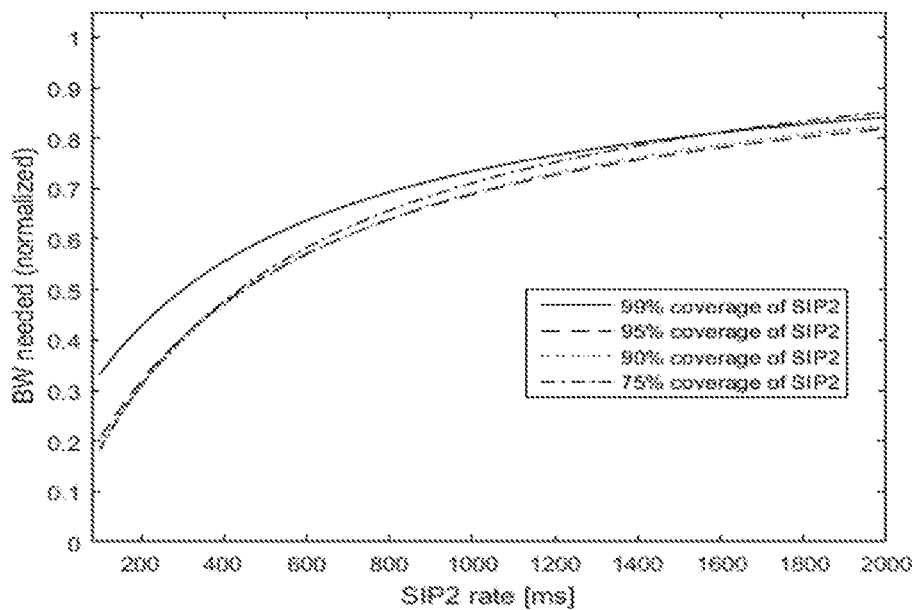
FIG. 14 is a graph showing the variation of bandwidth usage with different rates of broadcast of the second system information part, for a number of different coverages for the second system information part.

FIG. 14 is a graph showing the variation of bandwidth usage with different rates of broadcast of the second part of the system information, for a number of different coverages for the second part of the system information. This graph makes the same assumptions as above with respect to FIG. 13, but fixes the user arrival rate at 5 per second and varies the rate of how often $SIP_2$ is broadcast. The results show that the gain is very high in systems where the entire system information is broadcast more frequently, but that it is still more efficient than the "conventional approach" even when $SIP_2$ is not very frequent.

Figure 15:
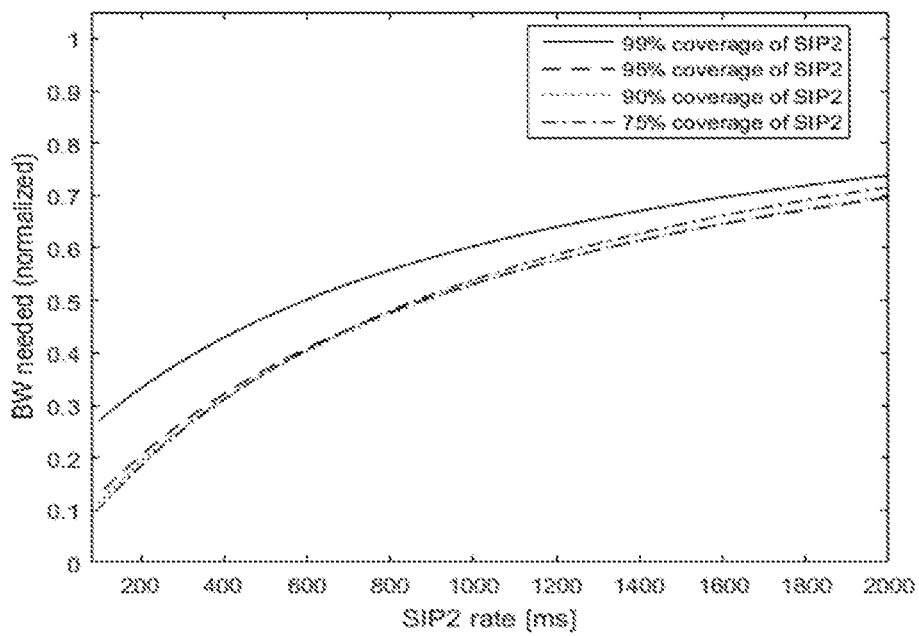
FIG. 15 is a graph showing the variation of bandwidth usage with different rates of broadcast of the second system information part when using a beam-sweeping procedure as shown in FIG. 3.

FIG. 15 is a graph showing the variation of bandwidth usage with different rates of broadcast of the second part of the system information when using a beam-sweeping procedure as shown in FIG. 3.

In this example, there are 10 beams in the sweeping procedure, which implies a beam-forming gain of 10 dB. $SIP_1$ is transmitted every 10 ms (i.e. every 100 ms in each beam), and $RRS_{SIP}$ resources are allocated for a user arrival rate of 20 per second. The graph shows that the reduction in required BW is even greater using the concept set out in FIG. 3.

The present disclosure thus provides methods and apparatus for a wireless communications network in which system information can be provided on an efficient basis to mobile devices in the network. The system information is split into two parts, with the second part being transmitted to mobile devices in response to receipt of one or more request signals from those mobile devices. The second part of the system information may additionally be broadcast.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a network node of a wireless communications network, the method comprising:
   initiating broadcast, from a base station of the wireless communications network, of a first system information signal containing a first system information part for the wireless communication network;
   obtaining one or more radio properties of one or more signals received from one or more mobile devices; and
   using the one or more radio properties to formulate a second system information signal containing a second system information part; and,
   in response to receipt by the base station of one or more request signals from the one or more mobile devices, initiating transmission, from the base station, of the second system information signal.

2. The method of claim 1, wherein the one or more signals received from the one or more mobile devices comprise one or more of: the one or more request signals; a physical random access preamble (PRACH); and one or more further signals received from the mobile devices transmitted upon the instruction of the base station.

3. The method of claim 1, wherein the one or more radio properties include one or more of: an estimate of the channels over which the one or more signals were transmitted; a direction from which the one or more signals were transmitted; an estimate of path gain between the base station and the one or more mobile devices; an estimate of time of arrival for signals transmitted between the base station and the one or more mobile devices; and an estimate of link adaptation required for signals transmitted between the base station and the one or more mobile devices.

4. The method of claim 1, wherein the first system information signal contains an indication of the transmission parameters to be used for the one or more request signals.

5. The method of claim 1, wherein the second system information signal is transmitted in a direction towards the one or more mobile devices.

6. The method of claim 5, wherein the second system information signal is beamformed to the one or more mobile devices, or wherein the second system information signal is transmitted using one or more antennas facing in a direction towards the one or more mobile devices.

7. The method of claim 1, further comprising:
   initiating broadcast, from the base station, of a third system information signal containing the second system information part.

8. The method of claim 7, wherein broadcast of the third system information signal immediately follows broadcast of the first system information signal.

9. The method of claim 7, wherein the first system information part contains an indication of the wireless resources over which the third system information signal is to be broadcast.

10. The method of claim 7, wherein the third system information signal is broadcast with a lower energy per bit than the first system information signal.

11. The method of claim 1, wherein the first system information part contains an indication of the wireless resources over which a third system information signal, containing the second system information part, is to be broadcast, the method further comprising:
not initiating the broadcast of the third system information signal using the indicated wireless resources.

12. The method of claim 1, wherein the step of initiating broadcast of the first system information signal comprises initiating successive broadcasts of respective first system information signals from a plurality of antennas of the base station, wherein each of the plurality of antennas is directed in a different direction.

13. The method of claim 12, further comprising:
determining whether one or more request signals are received by the base station in a window following transmission of one of the respective first system information signals by a respective antenna;
wherein the step of initiating transmission of the second system information signal comprises initiating transmission of the second system information signal by the respective antenna.

14. A network node for a wireless communications network, the network node comprising processor circuitry and a computer-readable storage medium, the computer-readable storage medium storing instructions that are executable by the processor circuitry whereby the network node is operative to:
initiate broadcast, from a base station of the wireless communications network, of a first system information signal containing a first system information part for the wireless communication network;
obtain one or more radio properties of one or more signals received from one or more mobile devices; and
use the one or more radio properties to formulate a second system information signal containing a second system information part; and
in response to receipt by the base station of one or more request signals from one or more mobile devices, initiate transmission, from the base station, of the second system information signal.

15. A method in a mobile device of a wireless communications network, the method comprising:
receiving, from a base station of the wireless communications network, a first system information signal containing a first system information part for the wireless communication network;
determining the received power of the first system information signal;
comparing the received power to one or more threshold values; and
determining which set of transmission parameters, of a plurality of sets of transmission parameters, to use for a request signal based on the comparison;
transmitting to the base station the request signal requesting transmission of a second system information signal containing a second system information part, wherein the step of transmitting the request signal comprises transmitting the request signal using the determined set of transmission parameters; and
receiving, from the base station, the second system information signal containing the second system information part.

16. The method of claim 15, wherein the first system information signal contains an indication of the transmission parameters to be used for the one or more request signals, and wherein the step of transmitting the request signal comprises transmitting the request signal using the transmission parameters.

17. The method of claim 15, further comprising:
listening for broadcast of a third system information signal containing the second system information part, wherein the step of transmitting the request signal comprises transmitting the request signal in response to failure of the mobile device to receive the third system information signal.

18. A mobile device comprising at least one antenna, processor circuitry and a computer-readable storage medium, the computer-readable storage medium storing instructions that are executable by the processor circuitry whereby the mobile device is operative to:
receive, from a base station of a wireless communications network, a first system information signal containing a first system information part for the wireless communication network;
determine the received power of the first system information signal;
compare the received power to one or more threshold values; and
determine which set of transmission parameters, of a plurality of sets of transmission parameters, to use for a request signal based on the comparison;
transmit to the base station the request signal requesting transmission of a second system information signal containing a second system information part, using the determined set of transmission parameters; and
receive, from the base station, the second system information signal containing the second system information part.

* * * * *